United States Patent [19]
Kliman et al.

[11] Patent Number: 5,345,130
[45] Date of Patent: Sep. 6, 1994

[54] MODABLE PERMANENT MAGNET ROTOR FOR OPTIMIZED FIELD SHAPING

[75] Inventors: Gerald B. Kliman, Schenectady, N.Y.; Eike Richter, Cincinnati, Ohio

[73] Assignee: General Electric Company, Schenectady, N.Y.

[21] Appl. No.: 53,275

[22] Filed: Apr. 28, 1993

[51] Int. Cl.⁵ .......................................... H02K 21/12
[52] U.S. Cl. ........................... 310/156; 310/43; 310/261; 335/302
[58] Field of Search ................. 310/156, 44, 181, 261, 310/43, 42; 335/296, 302, 306

[56] References Cited

U.S. PATENT DOCUMENTS

| | | | |
|---|---|---|---|
| 4,748,359 | 5/1988 | Yahara | 310/156 |
| 4,954,736 | 9/1990 | Kawamoto | 310/156 |
| 4,973,872 | 11/1990 | Dohogne | 310/156 |
| 5,065,063 | 11/1991 | Watanabe | 310/156 |
| 5,079,466 | 1/1992 | Jones | 310/43 |
| 5,170,085 | 12/1992 | Shinto | 310/156 |
| 5,220,227 | 6/1993 | Ohi . | |

OTHER PUBLICATIONS

B. S. Rahman et al., "Optimization of Ring Magnet Geometry for Field Harmonic Control in Electric Motors", IEEE Trans. on Magnetics, vol. 28, No. 6, Nov. 1992, pp. 3380 and 3386.

Primary Examiner—R. Skudy
Attorney, Agent, or Firm—Jill M. Breedlove; Marvin Synder

[57] ABSTRACT

A permanent magnet rotor is shaped to optimize the flux distribution thereabout. In one embodiment, cutouts in the rotor core between magnetic poles forces more of the magnetizing flux, i.e., that which would normally be distributed about the transition zone between the poles, into the main part of the poles, resulting in a substantially trapezoidal flux distribution that is substantially flat over approximately the central 120° of each respective 180° half-cycle thereof. In an alternative embodiment, the rotor core is shaped to be substantially square with rounded edges. Permanent magnet material is molded onto the square-shaped rotor core to form a plurality of magnetic poles such that the flux distribution about the rotor core is substantially sinusoidal.

3 Claims, 4 Drawing Sheets

MODABLE PERMANENT MAGNET ROTOR FOR OPTIMIZED FIELD SHAPING

FIELD OF THE INVENTION

The present invention relates generally to permanent magnet motors and, more particularly, to a permanent magnet rotor having permanent magnets molded thereon, with the rotor core being shaped to optimize flux distribution thereabout.

BACKGROUND OF THE INVENTION

A typical permanent magnet rotor has preformed arcs of ferrite magnets (e.g., three 120° arcs) glued to a solid or laminated rotor core. (Pole arcs referred to herein are in electrical degrees.) Often, a thin stainless steel cylinder or a fiber wrap over the magnets is used to restrain them against centrifugal forces and glue deterioration. More recently, rings of bonded magnets have become available; these are glued onto solid or laminated cores. When a more sinusoidal flux distribution is desired, magnets of varying thickness are glued onto the core.

Brushless dc motors are usually run in either a flat-top flux or a sinusoidal flux mode. For most applications, the flux distribution should be flat over the central 120° of the pole arc. This results in relatively smooth torque output and higher torque per ampere. For position-controlled servos, for example, such as are often used in machine tools, a sinusoidal flux distribution is desirable in order to enhance the ability to hold tool position at a particular angle without excessive jitter. In motors, however, especially as the number of poles increases, it becomes difficult to maintain the flux distribution substantially flat over the full 120° range.

Accordingly, it is desirable to provide a simple and economical technique for achieving a desired flux distribution in a permanent magnet rotor, particularly in rotors having molded magnets.

SUMMARY OF THE INVENTION

A permanent magnet rotor is shaped to optimize the flux distribution thereabout. According to one embodiment, cut-outs in the rotor core between magnetic poles force more of the magnetizing flux, i.e., that which would normally be distributed about the transition zone between the poles, into the main part of the poles, resulting in a substantially trapezoidal flux distribution that is substantially flat over approximately the central 120° of each respective 180° half-cycle thereof. In an alternative embodiment, the rotor core is shaped to be substantially square with rounded edges. Permanent magnet material is molded onto the square-shaped rotor core to form a plurality of magnetic poles such that the flux distribution about the rotor core is substantially sinusoidal.

BRIEF DESCRIPTION OF THE DRAWINGS

The features and advantages of the present invention will become apparent from the following detailed description of the invention when read with the accompanying drawings in which:

FIG. 6b illustrates an alternative embodiment of the rotor core of FIG. 6a.

DETAILED DESCRIPTION OF THE INVENTION

Figure 1A:
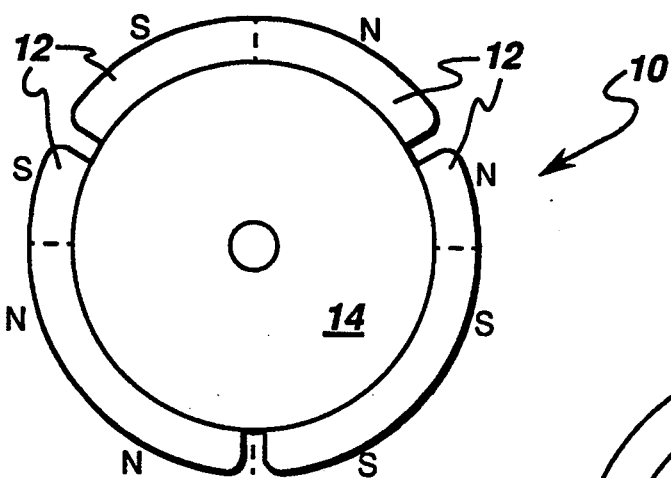
FIG. 1a illustrates a conventional permanent magnet rotor having three 120° ferrite arcs glued to a rotor core.
Figure 1B:
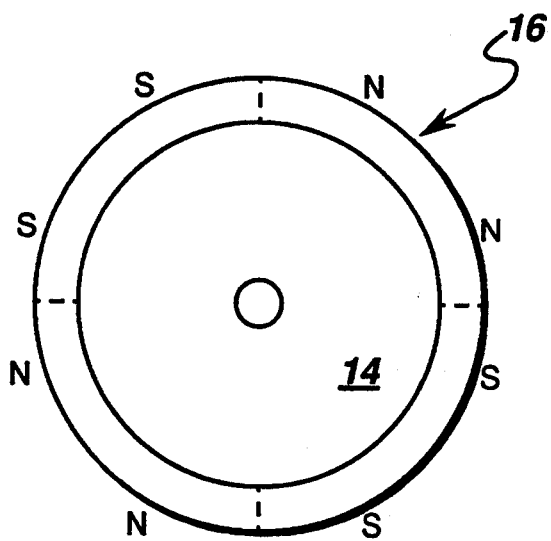
FIG. 1b illustrates a conventional ring of magnets that is either preformed or molded in place.
Figure 1C:
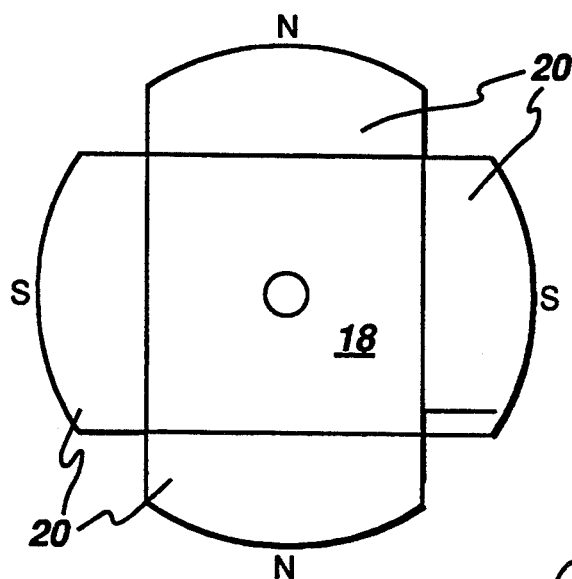
FIG. 1c illustrates a known square rotor core structure with sector magnets.
Figure 1D:
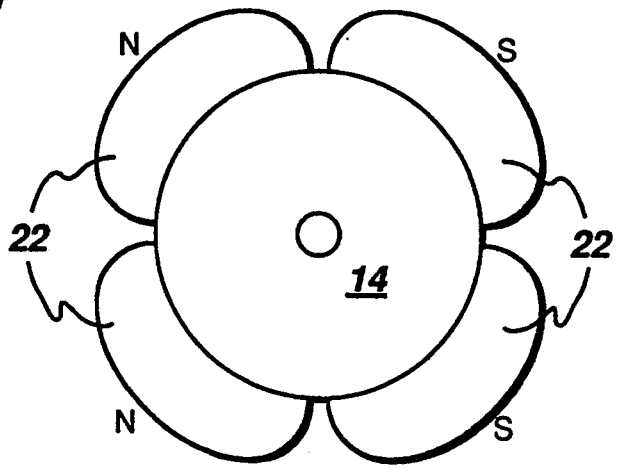
FIG. 1d illustrates a known rotor core structure employing lunes to improve sinusoidal flux distribution.

FIG. 1a illustrates a conventional permanent magnet rotor 10 having three preformed 120° ferrite arcs 12 glued to a rotor core 14. FIG. 1b illustrates the replacement of preformed magnets 12 with a ring of magnets 16 that is either preformed or molded in place. FIG. 1c illustrates the use of a square core 18 with sector magnets 20 glued thereto. FIG. 1d shows the use of lunes 22, or magnets of variable thickness, glued to round rotor core 14 for enhancing a sinusoidal flux distribution thereabout.

Figure 2:
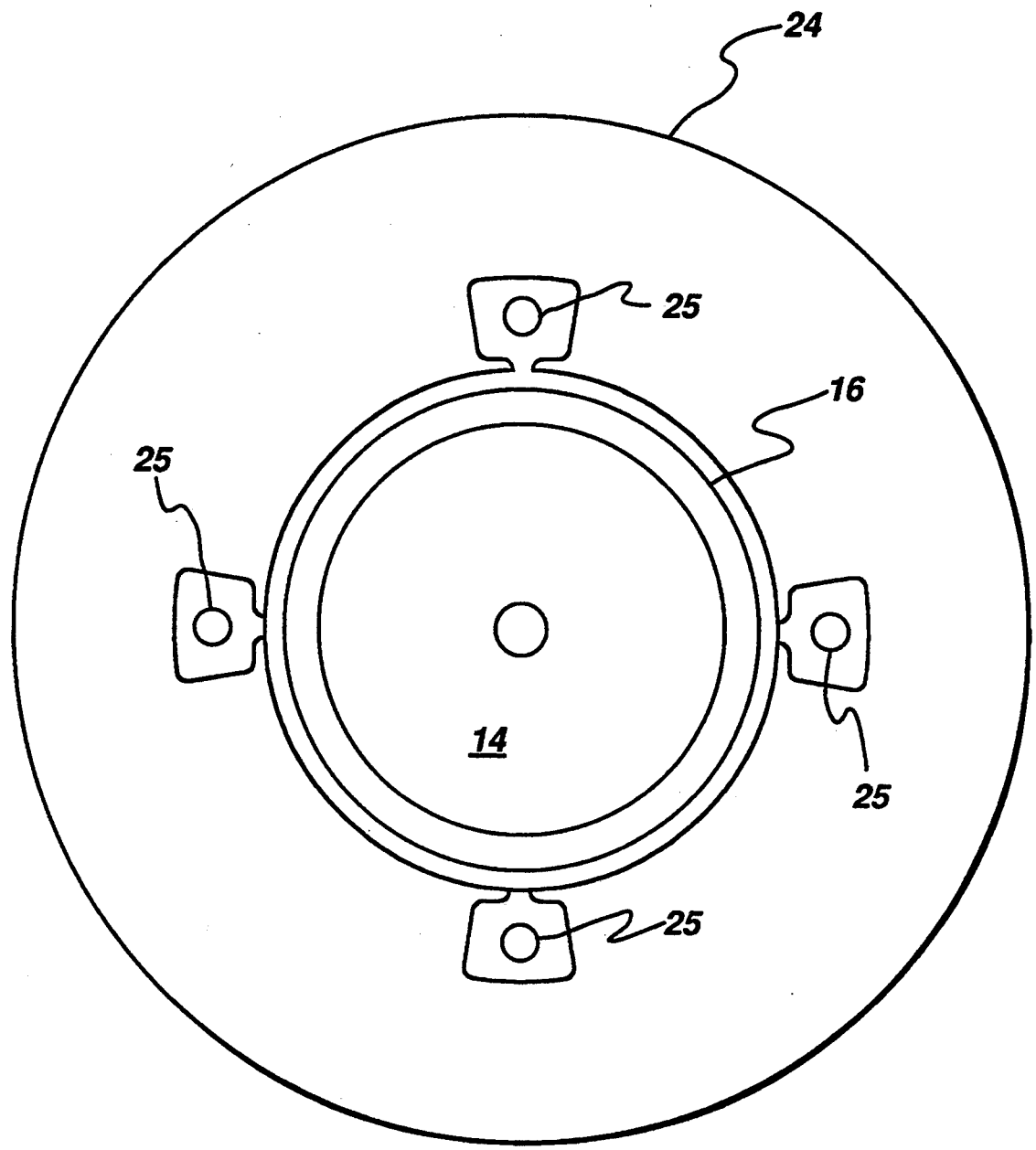
FIG. 2 illustrates a typical magnetizing fixture for a four-pole permanent magnet rotor.
Figure 3:
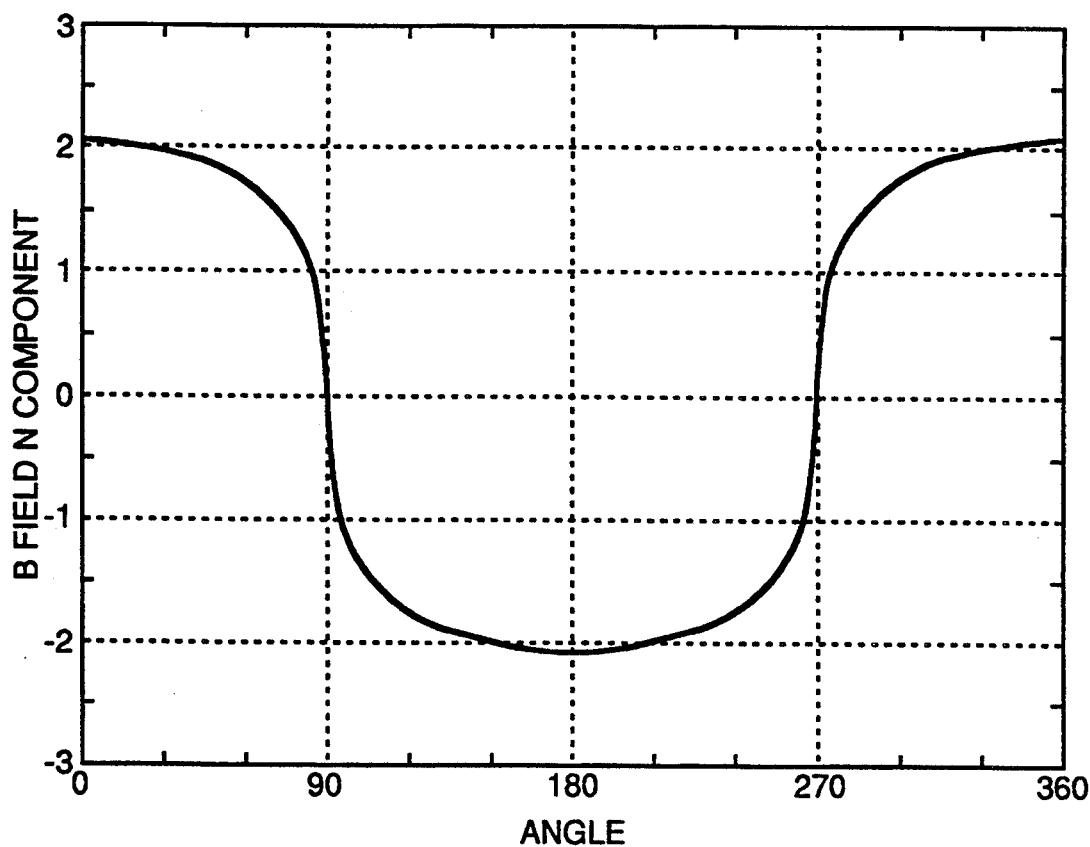
FIG. 3 graphically illustrates a typical magnetizing flux pattern for the magnetizing fixture of FIG. 2.
Figure 4A:
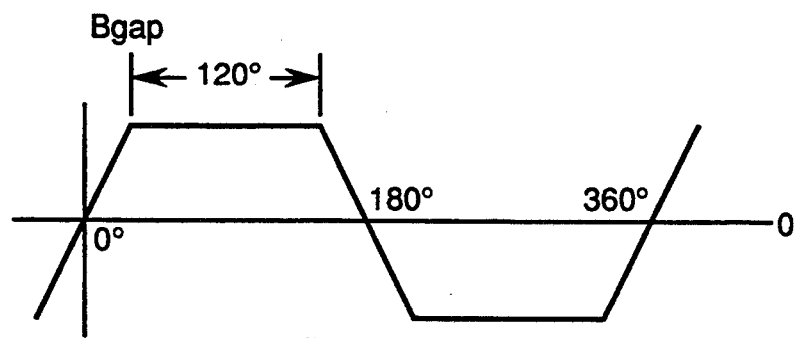
FIGS. 4a and 4b graphically illustrate ideal flux distributions for a brushless dc motor.
Figure 4B:
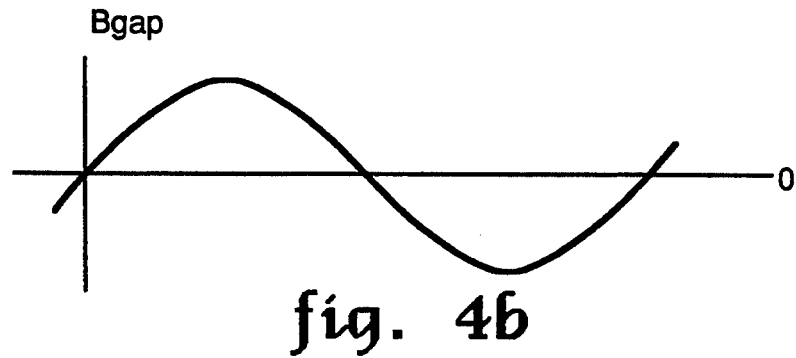

The permanent magnets for the rotors of FIGS. 1b–1d may be magnetized before or after assembly, but the rotor of FIG. 1a must be magnetized after assembly. FIG. 2 shows a typical magnetizing fixture 24 for a four-pole motor with rotor 14 in place. In well-known fashion, magnetizing fixture 24 includes coils 25 for carrying current to magnetize the poles. A typical flux distribution during magnetization by the fixture of FIG. 2 is illustrated in FIG. 3. As mentioned hereinabove, brushless dc motors are usually run in either a flat-top flux or a sinusoidal flux mode. For most applications, e.g., fans and compressors, the flux distribution should be flat over the central 120° of the pole arc, as illustrated by the ideal trapezoidal flux distribution of FIG. 4a. However, as the number of poles in a motor increases, it becomes difficult to maintain the flux substantially flat over the full 120°. In many other applications, a sinusoidal flux distribution is desirable, such as, for example, in position-controlled servos in machine tool applications. An ideal sinusoidal flux distribution is illustrated in FIG. 4b. Using common nomenclature, Bgap in FIGS. 4a and 4b designates the magnetic field intensity of the air gap about the rotor.

In accordance with the present invention, the shape of the flux distribution about a permanent magnet rotor core is optimized by suitably shaping the rotor core.

Figure 5:
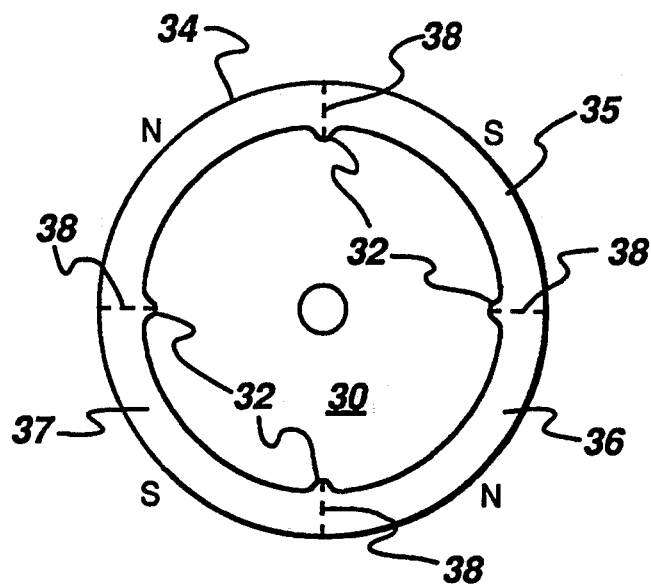
FIG. 5 illustrates a rotor core shaped according to one embodiment of the present invention for providing a substantially trapezoidal flux distribution that is substantially flat over approximately the central 120° of each respective 180° half-cycle thereof.

FIG. 5 illustrates a rotor core 30 according to the present invention having a shape optimized to provide a substantially trapezoidal flux distribution that is substantially flat over approximately the central 120° of each respective 180° half-cycle thereof. In particular, cut-outs 32 in the rotor core between adjacent magnetic poles 34–37 force more of the magnetizing flux, i.e., that which would normally be distributed about the transition zone 38 between the poles, into the main part of the poles, resulting in a substantially trapezoidal flux distribution that is substantially flat over approximately the central 120° of each respective 180° half-cycle thereof. The particular shape and width of cut-outs 32 depend on the size of the rotor core, the number of poles, the permanent magnet material employed, and the particular application. One method to determine the desired shape of cut-outs 32 is by finite element analysis.

Advantageously, manufacture of a rotor core such as that of FIG. 5 should be relatively simple and inexpensive . Rotor core 30 may comprise scrap material punched from the centers of stator laminations or may comprise molded iron powder. In either case, dies with the appropriate rotor shape are easily made according to well-known methods. The critical die for the cylindrical rotor surface molding is unchanged. For molded magnets, cut-outs 32 may be filled with additional magnetic material during the molding process. Alternatively, cut-outs 32 may be filled with the base material comprising the molded magnets, i.e., without the magnetic material, before molding the magnetic material. For solid magnets, the cut-outs are left as empty space.

Preferably, permanent magnets are molded onto the shaped rotor core. One suitable method for molding permanent magnets onto a rotor core that is shaped according to the present invention is described in commonly assigned U.S. patent application Ser. No. 08/020,968 of James Day, filed Feb. 22, 1993 and incorporated by reference herein. According to Day's method, a plastic binder is milled to a powder and dry mixed with flakes of permanent magnet material. Preferably, the plastic powder has a particle size equal to the mean size of the magnetic flakes. A molding fixture, having upper and lower chambers, is heated to a temperature preferably higher (e.g., approximately 10°–15° C. higher) than that of the melting point of the plastic binder. A rotor core with a given geometry of solid or laminated soft magnetic material is prepared and placed in the molding fixture and brought up to the molding temperature. The mixture is poured in measured amounts into the upper chamber of the hot molding fixture wherein the plastic component is allowed to melt, increasing the mixture's flowability and lubricity, and then compressed. The fluid mixture is transferred into a molding cavity in the lower chamber surrounding the rotor core and cooled. After cooling, the finished permanent magnet rotor is ejected. Advantageously, by Day's method, the proportion of magnetic material to plastic may be as large as approximately 80%/20% or more by volume. Furthermore, this method does not involve an extruder compounding step, which would otherwise tend to degrade both the binder and the magnetic material, while adding to cost. As another advantage, the result is a more uniform product without voids or shrinkage. Still further, thinner layers may be formed reliably.

Figure 6A:
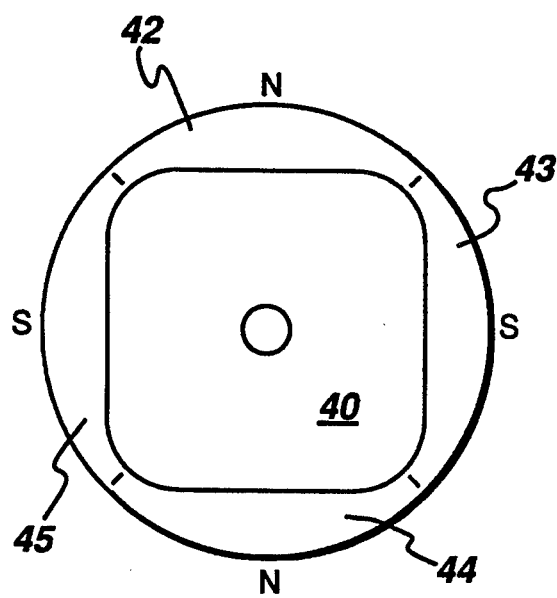
FIG. 6a illustrates a rotor core shaped according to an alternative embodiment of the present invention for providing a substantially sinusoidal flux distribution.
Figure 6B:
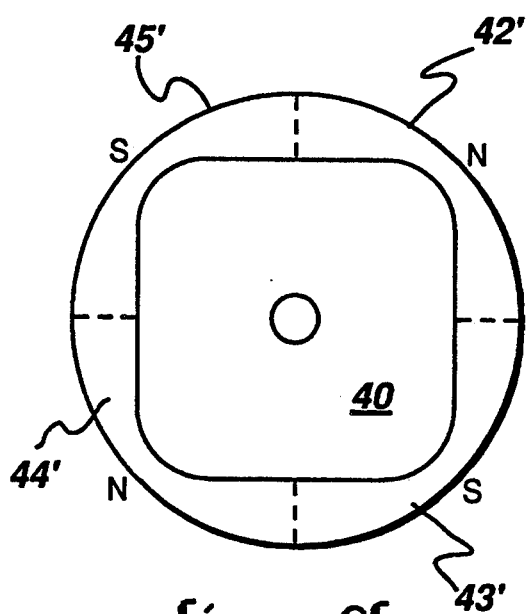

FIGS. 6a and 6b illustrate a rotor core 40 which is shaped to be substantially square with rounded edges. Preferably, permanent magnet material is molded onto the square-shaped rotor core to form a plurality of magnetic poles 42–45 (FIG. 6a) or 42'–45' (FIG. 6b) such that the flux distribution about the rotor core is substantially sinusoidal. However, solid magnets may be alternatively employed if suitably ground to shape. In the embodiment of FIG. 6a, each magnetic pole is situated substantially along one side of the square-shaped core. The embodiment of FIG. 6a is particularly adaptable for the case wherein there are sufficient ampere-turns in the magnetizing fixture (See FIG. 2) to fully saturate the magnets . As a result, the maximum flux density occurs at the point of maximum magnet thickness. On the other hand, in the embodiment of FIG. 6b, each magnetic pole 42'–45' extends from approximately the midpoint of one side to the midpoint of an adjacent side of the square, such that the flux distribution about the core is substantially sinusoidal, and the flux density toward the midpoints of the sides of the square is less than the flux density toward the corners of the square. In this case, only enough ampere-turns are required to fully magnetize the thinner portions of the magnets, leaving the thicker portions with a lower remanent flux density and thus a lower air gap flux density. The rotor cores of FIGS. 6a and 6b would be positioned differently in a magnetizing fixture (see FIG. 2) to achieve these effects.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A permanent magnet rotor, comprising:
   a rotor core with permanent magnet material disposed thereon to form a plurality of magnetic poles, said rotor core having a plurality of uniformly distributed cut-outs formed along the periphery thereof, said cut-outs having a shape which is determined to provide a substantially trapezoidal flux distribution that is substantially flat over approximately a central 120° of each respective 180° half-cycle thereof.

2. The permanent magnet rotor of claim 1 wherein said permanent magnet material is molded on said rotor core.

3. The permanent magnet rotor of claim 1, having four of said magnetic poles.

* * * * *

UNITED STATES PATENT AND TRADEMARK OFFICE
CERTIFICATE OF CORRECTION

PATENT NO. : 5,345,130

DATED : September 6, 1994

INVENTOR(S) : Gerald B. Kliman; Eike Richter

It is certified that error appears in the above-indentified patent and that said Letters Patent is hereby corrected as shown below:

On the title page item [54], "Modable" and insert --Moldable--.

On the title page item [56], column two, under Attorney, Agent or Firm, second line, delete "Synder" and insert --Snyder--.

Signed and Sealed this

Twentieth Day of December, 1994

*Attest:*

BRUCE LEHMAN

*Attesting Officer*     *Commissioner of Patents and Trademarks*